(12) United States Patent
Creutz et al.

(10) Patent No.: US 6,676,712 B2
(45) Date of Patent: Jan. 13, 2004

(54) PROCESS FOR THE CONCENTRATION OF AQUEOUS HYDROGEN PEROXIDE BY CRYSTALLIZATION

(75) Inventors: Matthias Creutz, Frankfurt (DE); Stefan Nordhoff, Aschaffenburg (DE); Rudolf Wagner, Grosskrotzenburg (DE); Jürgen Glenneberg, Offenbach (DE); Dieter Möller, Babenhausen (DE)

(73) Assignee: Degussa AG, Düsseldorf (DE)

( * ) Notice: Subject to any disclaimer, the term of this patent is extended or adjusted under 35 U.S.C. 154(b) by 265 days.

(21) Appl. No.: 09/983,995

(22) Filed: Oct. 26, 2001

(65) Prior Publication Data
US 2002/0062536 A1 May 30, 2002

(30) Foreign Application Priority Data
Nov. 4, 2000 (DE) .......................... 100 54 742

(51) Int. Cl.⁷ .............................................. C01B 15/02
(52) U.S. Cl. ................................. 23/295 R; 423/584
(58) Field of Search ....................... 23/295 R; 423/584

(56) References Cited

U.S. PATENT DOCUMENTS

| | | | |
|---|---|---|---|
| 3,952,089 A | | 4/1976 | Kabisch et al. ............... 423/588 |
| 4,343,955 A | | 8/1982 | Oshima et al. |
| 4,347,231 A | * | 8/1982 | Michaelson ................ 423/584 |
| 5,110,779 A | | 5/1992 | Hucul |
| 5,928,621 A | * | 7/1999 | Ledon et al. ................ 423/584 |
| 5,932,187 A | * | 8/1999 | Ledon et al. ................ 423/584 |
| 6,001,324 A | * | 12/1999 | Ledon et al. ................ 423/584 |
| 6,296,829 B1 | * | 10/2001 | Devos et al. ................ 423/584 |
| 6,540,921 B1 | * | 4/2003 | Devos et al. ................ 210/660 |

FOREIGN PATENT DOCUMENTS

| | | |
|---|---|---|
| DE | 1 041 479 | 9/1955 |
| EP | 0 814 098 | 12/1997 |
| FR | 1 416 559 | 11/1965 |
| GB | 889421 I | * 2/1962 |
| WO | WO 98/57913 | 12/1998 |

OTHER PUBLICATIONS

"Hydrogen Peroxide" by Walter C. Schumb et al., Reinhold Publishing Corp. (1955), p. 209–221, 302–309.
Patent Abstracts of Japan, vol. 1998, No. 2, Jan. 30, 1998 & JP 09 278417 A, Oct. 28, 1997.
International Search Report of PCT/EP01/11460 dated Jan. 30, 2002.
XP002187685 16820, cited in the application, pp. 210–221.

* cited by examiner

Primary Examiner—Wayne A. Langel
Assistant Examiner—William G. Wright, Sr.
(74) Attorney, Agent, or Firm—Smith, Gambrell & Russell, LLP

(57) ABSTRACT

A process for the concentration of aqueous hydrogen peroxide by discontinuous crystallization. A cooling surface is arranged in a crystallizing vessel and first wetted with hydrogen peroxide and then cooled at a high cooling rate, whereupon seed crystals form. The cooling rate is at least 1 K/s, preferably from 10 to 30 K/s. When the vessel has been filled with $H_2O_2$ starting material, the latter crystallizes, starting from the seed crystals, and forms a crystal layer. When the mother liquor of lower $H_2O_2$ concentration has been discharged, there follows a sweating operation with a slow increase in temperature, as a result of which the $H_2O_2$ concentration in the crystal layer is increased further.

11 Claims, 1 Drawing Sheet

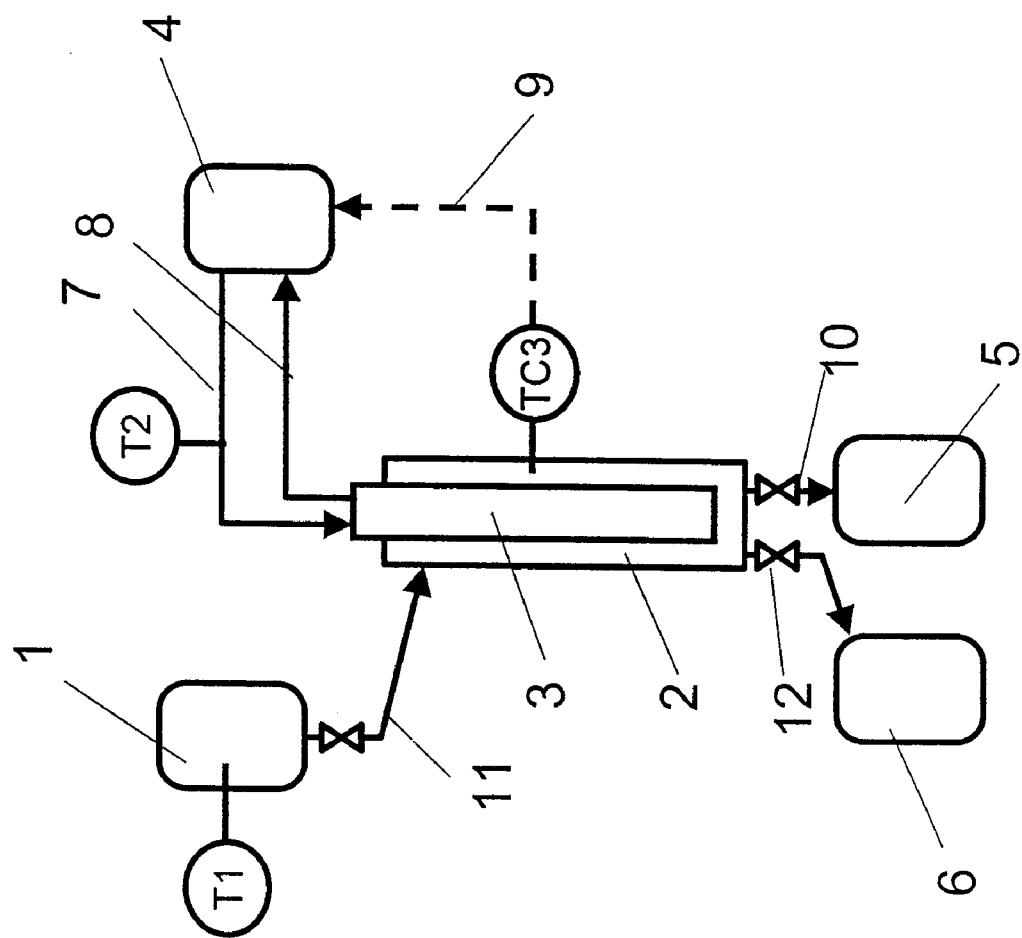

PROCESS FOR THE CONCENTRATION OF AQUEOUS HYDROGEN PEROXIDE BY CRYSTALLIZATION

INTRODUCTION AND BACKGROUND

The present invention is directed towards a process for the concentration of aqueous hydrogen peroxide of concentration $c_E$ ($H_2O_2$ starting material) in order to obtain hydrogen peroxide of concentration $c_P$ ($H_2O_2$ product), $c_P$ being equal to or greater than 90 wt. %, by means of discontinuous crystallization.

In the known processes for the preparation of hydrogen peroxide, such as the anthraquinone cyclic process, electrolytic processes and methods of direct synthesis, hydrogen peroxide is obtained in the form of an aqueous solution. In order to convert such solutions into marketable products, the preparation is usually followed by concentration of the solution by distillation. By means of distillation it is possible to obtain aqueous hydrogen peroxide solutions having a content of up to approximately 90 wt. % hydrogen peroxide. Cost and safety considerations stand in the way of further concentration by distillation.

More highly concentrated hydrogen peroxide, that is to say products having an $H_2O_2$ content in the range of from equal to/greater than 90 wt. % to approximately 100 wt. %, are increasingly gaining importance commercially owing to their high energy content. It is known that hydrogen peroxide having a content up to approximately 100 wt. % is obtainable by repeated recrystallization. Fundamental aspects regarding the crystallization of hydrogen peroxide, as well as the solid-liquid phase diagram of the hydrogen peroxide/water system, are known from the reference book "Hydrogen peroxide" by Walter C. Schumb et al., Reinhold Publishing Corp. (1955), p. 210–220. According to that book, a prominent property of highly concentrated aqueous hydrogen peroxide is the tendency to extreme supercooling, which makes concentration by crystallization more difficult. According to Schumb et al. (page 215), crystal formation is not affected in a reproducible manner either by stirring or scraping or by the cooling rate. However, freezing of supercooled highly concentrated hydrogen peroxide is induced by seeding with hydrogen peroxide crystals. The low efficiency of fractional batch crystallization is regarded as being a disadvantage of concentration by crystallization (Schumb et al., p. 215), since an increase in concentration of only approximately 2% and never more than 4% is achieved per crystallization stage. That problem is evidently the result of the high boundary solubility of water in crystallized hydrogen peroxide, which is also shown in the phase diagram (Schumb, page 211).

DE-PS 10 41 479 teaches an improved process for the concentration of aqueous hydrogen peroxide solutions. According to that process, an $H_2O_2$ starting material is cooled in a rectifying column to such an extent that there forms a 2-phase system consisting of a solid crystal phase and a liquid mother liquor, which phases differ according to the equilibrium with regard to the hydrogen peroxide concentration. The temperature along the rectifying column is so controlled that it increases slowly from one end to the other. Owing to the higher density of the crystallized hydrogen peroxide, the crystals and the mother liquor flow in a countercurrent relative to one another. A disadvantage of that continuous suspension crystallization process is the high technical outlay required to carry it out. Such a technical outlay only appears justified if very highly concentrated hydrogen peroxide is required regularly and/or in large amounts. However, the process is particularly uneconomical when the very highly concentrated hydrogen peroxide is required only periodically and/or in small amounts. In addition, scale-up poses problems.

Accordingly, an object of the present invention is to provide a simple process for the preparation of very highly concentrated hydrogen peroxide, that is to say hydrogen peroxide having a content in the region of equal to and, especially, greater than 90%, which process can be carried out batchwise by personnel with little training.

Another other object of the invention is to enable carrying out the process in simple technical apparatuses with little outlay in terms of control.

A still further object is to be able to scale up the process in a simple and reliable manner, in order to be adaptable to an increasing requirement.

SUMMARY OF THE INVENTION

The above and other objects can be achieved by the process according to the invention, which is based on the principle of layer crystallization with a subsequent sweating operation and which is carried out batchwise.

There has been found a process for the concentration of aqueous hydrogen peroxide of concentration $c_E$ ($H_2O_2$ starting material) in order to obtain hydrogen peroxide of concentration $c_P$ ($H_2O_2$ product), $c_P$ being equal to or greater than 90 wt. %, comprising discontinuous crystallization, which process is characterized in that a cooling surface arranged in a crystallizing vessel and wetted at least partially with hydrogen peroxide having a concentration of at least 70 wt. %, especially having a concentration in the range from $c_E$ to $c_P$, is cooled by means of a cooling medium located at its rear side, at a cooling rate of at least 1 K/s, from a temperature in the region of the melting point of the hydrogen peroxide used for wetting to a temperature at which seed crystals form in the wetting medium.

The vessel is filled with $H_2O_2$ starting material having a temperature below the melting point of the $H_2O_2$ seed crystals. The temperature of the cooling medium is lowered to a value in the range from below the melting point of the $H_2O_2$ product to $-50°$ C. and, starting from the seed crystals, a crystal layer is allowed to grow during the temperature reduction and, if required, additionally after the temperature has been reached, uncrystallized hydrogen peroxide is then removed from the vessel. The crystal layer is subjected to a sweating operation in which the temperature of the cooling medium is increased in the course of from 0.2 to 20 hours to a value in the range from 10 K below to 5 K above the melting point of the $H_2O_2$ product. Hydrogen peroxide that is sweated out is separated off and crystalline hydrogen peroxide of concentration $c_P$ is obtained.

Surprisingly, the process according to the invention allows an $H_2O_2$ starting material having an $H_2O_2$ content of about 90 wt. %, especially 90±2 wt. %, to be concentrated in one step to an $H_2O_2$ product having a content in the range of approximately from 97 to 99 wt. % or above.

The process according to the invention features the following essential steps:
1. formation of seed crystals on a cooling surface that has previously been wetted with highly concentrated hydrogen peroxide;
2. filling the vessel in which the cooling surface is located with the $H_2O_2$ starting material that is to be concentrated, the temperature of which is below the melting point of the seed crystals located on the cooling surface;

3. lowering the temperature of the cooling surface by reducing the temperature of the cooling medium, hydrogen peroxide having a higher concentration than that of the $H_2O_2$ starting material crystallizing on the cooling surface, starting from the seed crystals, during the cooling operation and the layer thickness of the crystal layer increasing;
4. discharging the uncrystallized aqueous hydrogen peroxide of reduced concentration (=mother liquor) from the crystallizing vessel;
5. carrying out a so-called sweating operation, in which the temperature of the cooling medium and hence of the cooling surface is slowly increased, the $H_2O_2$ concentration in the crystal layer increasing and less concentrated hydrogen peroxide dropping off as a melt.
6. The $H_2O_2$ product can be obtained by melting the crystal layer located on the cooling surface. After melting of the crystal layer, the cooling surface is again wetted with very highly concentrated hydrogen peroxide and can again be fed in that form to the first step of the process according to the invention.

BRIEF DESCRIPTION OF DRAWING

The present invention will be further understood with reference to the drawing which depicts a preferred, embodiment of the apparatus for carrying out the present invention.

DETAILED DESCRIPTION OF INVENTION

Wetting of the cooling surface may be effected in any desired manner, for example by spraying with or immersion in at least 70 wt. % $H_2O_2$, but preferably in the $H_2O_2$ starting material of concentration $c_E$. As mentioned above, it is also possible for the wetting medium to result from the preceding step, the concentration of which is generally greater than $c_E$. The concentration of the aqueous $H_2O_2$ used for the wetting is advantageously equal to or greater than $c_E$. Accordingly, the concentration of the aqueous hydrogen peroxide used for the wetting is preferably in the range from $c_E$ to $c_P$. Although the $H_2O_2$ starting material advantageously has a concentration of 90±2 wt. %, the $H_2O_2$ starting material may also have a concentration in the range from 70 to 98 wt. %.

A step that is fundamental to the invention is the shock-like cooling of the cooling surface wetted with aqueous hydrogen peroxide. That is effected by lowering the temperature of the cooling medium at a cooling rate of at least 1 K/second and preferably at least 5 K/s. The cooling rate is usually in the range from 1 to 50 K/s, especially from 5 to 40 K/s and especially preferably from 10 to 30 K/s.

The $H_2O_2$ starting material is introduced into the crystallizing vessel at a temperature below the melting point of the seed crystals. The temperature of the $H_2O_2$ starting material when it is introduced is preferably from 1 to 10 K, especially from 1 to 5 K, below its melting point. For the purposes of forming the crystal layer and increasing the layer thickness thereof on the cooling surface, the cooling medium is cooled slowly, namely from a temperature below the melting point of the seed crystals located on the cooling surface to a temperature in the range from −20 to −40° C. In the case of the concentration of approximately 90 wt. % aqueous hydrogen peroxide and seed crystals having a concentration in the range from $c_E$ to $c_P$, the cooling medium is reduced from a temperature in the range from −5 to less than −20° C., especially from −10 to −15° C., to from −20 to −40° C. That temperature reduction is advantageously carried out in the range of from 0.2 to 20 hours, but in most cases in the course of from 0.5 to 10 hours, especially from 1 to 5 hours.

In order to carry out the sweating operation, the temperature of the cooling medium and hence of the cooling surface is slowly increased again. By means of the sweating operation it is possible to increase the $H_2O_2$ concentration in the crystal layer, by sweating water dissolved in the crystal layer out of that layer in the form of less concentrated $H_2O_2$ solution. The final temperature of the cooling medium in the sweating operation is generally in the range from 10 K below to 5 K above the melting point of the $H_2O_2$ product— at a temperature above the melting point, the cooling surface should have holding means for the crystal layer. According to a preferred embodiment for the preparation of $H_2O_2$ of $c_P$>97 wt. %, the temperature is increased in the course of a period of from 1 to 10 hours to a value of from 1 to 5 K below the melting point of the $H_2O_2$ product.

Simple devices are suitable for carrying out the process according to the invention. According to one embodiment, the crystallizing surface is a cooling finger that is immersed in a crystallizing vessel and may be tubular or plate-like in construction. According to a further embodiment, the cooling surface itself forms part of the crystallizing vessel—for example, one or more lateral surfaces may be in the form of the cooling surface—a plate-like heat exchanger is suitable, for example. In order to allow the sweating operation to be carried out in a simple manner, it is advantageous for the cooling surface to be arranged vertically or at least slantingly in the crystallizing vessel. In that manner, less concentrated hydrogen peroxide that is sweated out is able to drop off from the crystal layer located on the cooling surface.

The apparatus according to the Figure comprises a storage container 1 for the $H_2O_2$ starting material to be concentrated. A device for cooling the $H_2O_2$ starting material to the temperature suitable for filling the crystallizing vessel 2 is not shown in the Figure. The $H_2O_2$ starting material is introduced into the crystallizing vessel 2 via the inlet 11. In the crystallizing vessel 2 there is a cooling finger 3, the temperature of which is controlled by means of a cooling machine 4 via the flow pipe 7 and the return pipe 8, in order to achieve the temperature required in the various stages. Uncrystallized aqueous hydrogen peroxide (mother liquor) is discharged into the mother liquor container 6 via the outlet 12. The hydrogen peroxide obtained in the sweating operation, having a lower concentration than that in the crystal layer, is also discharged into the mother liquor container. When the sweating operation is complete, the crystal layer of the $H_2O_2$ product is melted and discharged into the product container 5 via the outlet 10. The power of the cooling machine 4 is controlled by way of a line of action 9 via temperature(s) measured by means of one or more temperature-measuring device(s). A temperature-measuring probe is located in the cooling circuit (T2), a further temperature-measuring probe (TC3) is located in the crystallizing vessel.

The process according to the invention is simple to carry out. The process steps to be carried out and maintenance of the simple apparatus for carrying out the process can be undertaken by personnel with little training. Using an approximately 90 wt. % $H_2O_2$ starting material it is possible to obtain from 98 to 99 wt. % hydrogen peroxide in one step. An increase in capacity can be achieved in view of the simple apparatus by "numbering-up". The Examples and Comparison Examples which follow illustrate the invention.

EXAMPLE 1

The process according to the invention was carried out in the apparatus described above. The $H_2O_2$ starting material had a concentration $c_E$ of 90.5 wt. %. The $H_2O_2$ starting material in the container 1 was cooled to a temperature slightly below the crystallization temperature—from 1 to 5 K supercooling. The cooling finger was immersed in $H_2O_2$ starting material and cooled at a cooling rate of the cooling medium of 17 K/s. At −35° C., seed crystals formed in the wetting medium. When vessel 2 had been filled with $H_2O_2$ starting material, the temperature of the cooling medium was lowered over a period of 1.5 hours from −12 to −30° C. During that time, an $H_2O_2$-enriched fraction was frozen out as a layer on the cooling finger. The residual liquid (mother liquor) was then discharged into the mother liquor container 6. With the line 12 open, the sweating operation was carried out by increasing the temperature of the cooling medium from −30° C. to −5° C. in the course of a period of 5 hours. After closing the outlet 12 and opening the outlet 10, the crystallizate that remained on the cooling finger, that is to say the $H_2O_2$ product, having a concentration of $c_P$=98.3 wt. %, was melted and discharged into the product container. After crystallization of the $H_2O_2$ starting material on the cooling finger, 37% mother liquor, based on the amount originally used, was discharged; a further 16% was discharged during the sweating process. Accordingly, 50.5 wt. % of the hydrogen peroxide contained in the $H_2O_2$ starting material was concentrated from a concentration of 90.5 wt. % to a concentration of 98.3 wt. %.

COMPARISON EXAMPLE 1

Aqueous hydrogen peroxide having a concentration of 90.5 and 98 wt. % was applied in the form of a spray film to a cooling pipe at a starting temperature of in each case 0° C. The temperature of the cooling pipe was −40° C. Crystal formation was not observed in either case.

COMPARISON EXAMPLE 2

Aqueous hydrogen peroxide having a concentration of 90.5 wt. % was pre-cooled to −22° C. The solution was introduced into the crystallizing vessel according to the Figure equipped with a cooling finger, the temperature of the cooling medium being −40° C. Spontaneous, uncontrolled crystal formation was observed. After carrying out a sweating operation, in which the temperature of the cooling medium was slowly increased to −5° C., a hydrogen peroxide product having a content of only 96.9 wt. % was obtained. In contrast, a higher $H_2O_2$ concentration is achieved by means of the process according to the invention.

Further variations and modifications of the foregoing will be apparent to those skilled in the art and are intended to be encompassed by the claims appended hereto.

German priority application 100 54 742.7 is relied on and incorporated herein by reference.

We claim:

1. A process for the concentration of aqueous hydrogen peroxide of concentration $c_E$ ($H_2O_2$ starting material) in order to obtain hydrogen peroxide of concentration $c_P$ ($H_2O_2$ product), $c_P$ being equal to or greater than 90 wt. %, comprising discontinuously crystallization, by arranging a cooling surface in a crystallizing vessel and wetting said surface at least partially with hydrogen peroxide having a concentration of at least 70 wt. %, cooling by a cooling medium located at a rear side of said surface, at a cooling rate of at least 1 K/s, from a temperature in the region of the melting point of the hydrogen peroxide used for wetting to a temperature at which seed crystals form in the wetting medium, filling the vessel with $H_2O_2$ starting material having a temperature below the melting point of the $H_2O_2$ seed crystals, lowering the temperature of the cooling medium to a value in the range from below the melting point of the $H_2O_2$ product to −50° C. and, starting from the seed crystals, allowing a crystal layer to grow during temperature reduction and, optionally, additionally after a desired temperature has been reached, removing uncrystallized hydrogen peroxide from the vessel and subjecting the crystal layer to a sweating operation in which the temperature of the cooling medium is increased in the course of from 0.2 to 20 hours to a value in the range from 10 K below to 5 K above the melting point of the $H_2O_2$ product, separating the hydrogen peroxide that is sweated out and obtaining crystalline hydrogen peroxide of concentration $c_P$.

2. The process according to claim 1, wherein the hydrogen peroxide has a concentration in the range from $c_E$ to $c_P$.

3. The process according to claim 1, further comprising increasing the $H_2O_2$ starting material in one step from $c_E$=90±2 wt. % to $H_2O_2$ product of $c_P$=from 97 to 99 wt. %.

4. The process according to claim 1, wherein the cooling surface is a cooling finger immersed in the crystallizing vessel, the cooling medium circulating inside the cooling finger, or the crystallizing vessel is in the form of a plate-like heat exchanger.

5. The process according to claim 2, wherein the cooling surface is a cooling finger immersed in the crystallizing vessel, the cooling medium circulating inside the cooling finger, or the crystallizing vessel is in the form of a plate-like heat exchanger.

6. The process according to claim 3, wherein the cooling surface is a cooling finger immersed in the crystallizing vessel, the cooling medium circulating inside the cooling finger, or the crystallizing vessel is in the form of a plate-like heat exchanger.

7. The process according to claim 1, further comprising for the purposes of forming seed crystals in the wetted areas, cooling the cooling medium at a cooling rate of at least 5 K/s.

8. The process according to claim 1, further comprising for the purposes of forming seed crystals in the wetted areas, cooling the cooling medium at a cooling rate from 10 to 30 K/s.

9. The process according to claim 1 wherein the vessel is filled with $H_2O_2$ starting material having a temperature in the range from −5 to less than −20° C. and then, in order to form the crystal layer, the temperature of the cooling medium is lowered in the course of from 0.5 to 10 hours to a temperature in the range from −20 to −40° C.

10. The process according to claim 1, wherein in order to carry out the sweating operation, wherein an $H_2O_2$-enriched fraction remains in the crystal layer and less concentrated hydrogen peroxide drops off as a melt, the temperature of the cooling medium is increased in the course of a period of from 1 to 10 hours to a value in the range from 5 K below to 5 K above, the melting point of the $H_2O_2$ product.

11. The process according to claim 1, wherein in order to carry out the sweating operation, wherein an $H_2O_2$-enriched fraction remains in the crystal layer and less concentrated hydrogen peroxide drops off as a melt, the temperature of the cooling medium is increased in the course of a period of from 1 to 10 hours to a value in the range from 5 to 1 K below, the melting point of the $H_2O_2$ product.

* * * * *